United States Patent [19]

Henzi

[11] 3,980,632
[45] Sept. 14, 1976

[54] BASIC AZO DYES HAVING A QUATERNIZED S-TRIAZOLO-[2,3-A]-PYRIMIDINE DIAZO COMPONENT RADICAL

[75] Inventor: Beat Henzi, Neuallschwil, Switzerland

[73] Assignee: Sandoz Ltd., Basel, Switzerland

[22] Filed: May 16, 1974

[21] Appl. No.: 471,365

Related U.S. Application Data

[63] Continuation-in-part of Ser. No. 327,715, Jan. 29, 1973, abandoned.

[30] Foreign Application Priority Data

Feb. 3, 1972 Switzerland............... 1607/72
Mar. 10, 1972 Switzerland............... 3559/72

[52] U.S. Cl. ............... 260/146 D; 260/147; 260/154; 260/256.4 F; 260/256.5 R
[51] Int. Cl.² ............... C09B 29/08; C09B 29/12; C09B 29/36; C09B 29/38
[58] Field of Search............... 260/146 D, 147, 154

[56] References Cited
UNITED STATES PATENTS

| | | | |
|---|---|---|---|
| 2,432,419 | 12/1947 | Heimbach | 260/154 |
| 2,569,418 | 9/1951 | Kellog | 260/154 |
| 3,515,715 | 6/1970 | Straley et al. | 260/163 |
| 3,654,259 | 4/1972 | Iizuka et al. | 260/146 R X |
| 3,679,656 | 7/1972 | Iizuka et al. | 260/154 X |
| 3,804,823 | 4/1974 | Fisher et al. | 260/154 X |

OTHER PUBLICATIONS
Bee et al., J. Chem. Soc. C 1966, 2031–2038.

*Primary Examiner*—Charles F. Warren
*Attorney, Agent, or Firm*—Gerald D. Sharkin; Richard E. Vila; Melvyn M. Kassenoff

[57] ABSTRACT

Basic azo dyes free from sulphonic acid groups of the formula

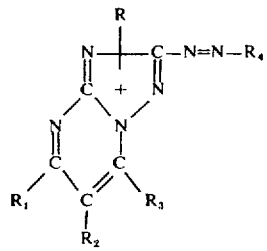

in which R signifies an alkyl or alkenyl radical,
$R_1$ and $R_3$ independently signify hydrogen, hydroxyl, halogen, an alkyl, aryl, cycloalkyl, alkoxy, aryloxy, amino or alkylthio radical,
$R_2$ signifies hydrogen, an alkyl, aryl or cycloalkyl radical,
$R_4$ signifies the radical of a coupling component of the aliphatic, benzene, naphthalene or heterocyclic series, and
$A^{\ominus}$ signifies an organic or inorganic anion,
which compounds are useful for dyeing synthetic materials, leather and paper and for pigmenting plastics.

46 Claims, No Drawings

3,980,632

BASIC AZO DYES HAVING A QUATERNIZED S-TRIAZOLO-[2,3-A]-PYRIMIDINE DIAZO COMPONENT RADICAL

This application is a continuation-in-part of application Ser. No. 327,715, filed Jan. 29, 1973, and now abandoned.

The present invention relates to basic azo dyes. More particularly, the present invention provides basic azo dyes, free from sulphonic acid groups, of formula I,

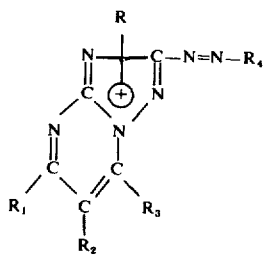

I wherein
R signifies an unsubstituted or substituted alkyl or alkenyl radical containing up to 18 carbon atoms,
$R_1$ and $R_3$, independently, signify a hydrogen atom, a hydroxyl group, a halogen atom, an unsubstituted or substituted alkyl, aryl, cycloalkyl, alkoxy or aryloxy radical or an unsubstituted or substituted amino group or an alkylthio radical, which alkyl group contains 1 to 18 carbon atoms, which cycloalkyl radical contains 5 to 7 carbon atoms, which alkoxy radical contains from 1 to 6 carbon atoms and which alkylthio radical contains 1 to 6 carbon atoms,
$R_2$ signifies a hydrogen atom, an unsubstituted or substituted alkyl, aryl or cycloalkyl radical, which alkyl radical is of 1 to 18 carbon atoms and which cycloalkyl radical is of 5 to 7 carbon atoms,
$R_4$ signifies the radical of a coupling component of the benzene, naphthalene or heterocyclic series, or a radical of a coupling component of the aliphatic series, and
$A^-$ signifies an organic or inorganic anion.

The invention also provides a process for the production of azo dyes of formula I, as defined above, characterized by quaternizing a compound of formula II,

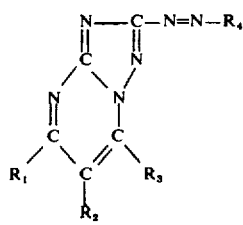

II in which $R_1$, $R_2$, $R_3$ and $R_4$ are as defined above, with a compound of formula III,

   III in which R is as defined above, and A signifies a radical convertible to the anion $A^-$, as defined above.

The quaternization reaction can be carried out in accordance with the normal methods, for example in an inert solvent or in an aqueous suspension, or without solvent in an excess of the quaternizing agent, if necessary at high temperature and if necessary in buffered medium. Examples of suitable quaternating agents are alkyl halides such as methyl and ethyl chloride, bromide, iodide, alkyl sulphates such as dimethyl sulphate, benzyl chloride, acrylic acid amide hydrohalides, for example $CH_2=CH-CO-NH_2/HCl$, chloroacetic acid amide, epoxides such as ethylene oxide, propylene oxide and epichlorohydrin.

Representative of the dyes of formula I are those of formulae Ia, Ib and Ic,

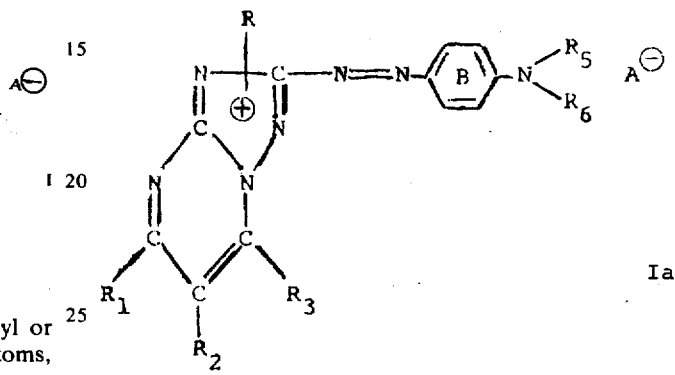

Ia

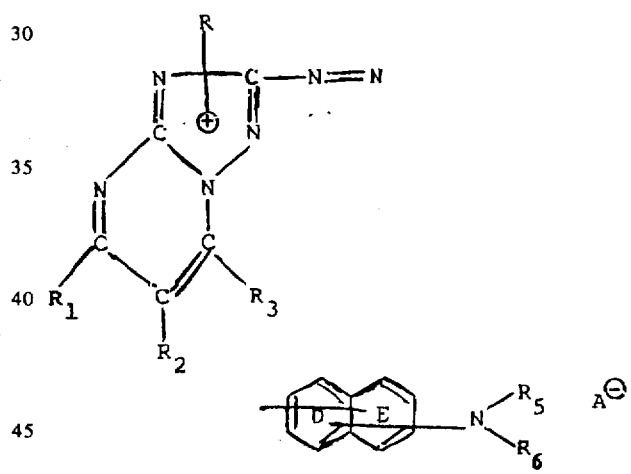

Ib

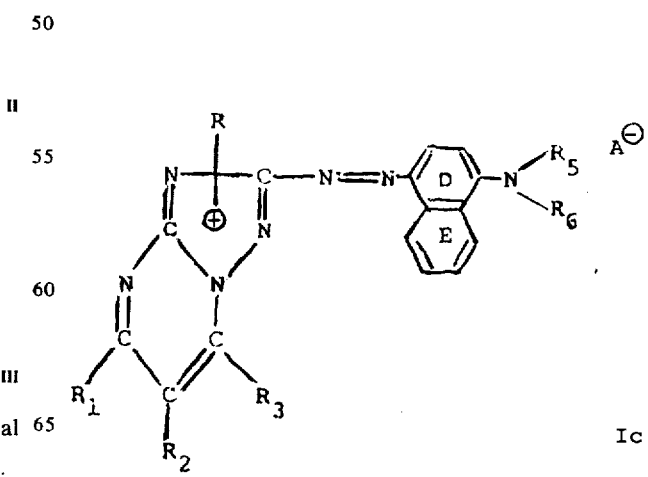

Ic in which R, $R_1$, $R_2$, $R_3$ and $A^-$ are as defined above, either $R_5$ and $R_6$, independently, signify a hydrogen atom, an unsubstituted or substituted alkyl radical of 1 to 6 carbon atoms or a phenyl radical, (preferably neither $R_5$ nor $R_6$ is hydrogen)

or, $R_5$ and $R_6$, together with the nitrogen atom to which they are attached, form a five or six-membered saturated or partially saturated heterocyclic radical, and rings B, D and E are unsubstituted aromatic rings or aromatic rings substituted by groups other than cationic groups.

As will be appreciated, in the compounds of the invention, for steric reasons, preferably only one of $R_5$ and $R_6$ signifies a phenyl radical, and likewise in the following compounds where $R_{12}$, $R_{13}$, $R_{12}'$ or $R_{13}'$ signifies a phenyl radical.

In the compounds of formula I, Ia, Ib and Ic, R, $R_1$, $R_2$ and $R_3$, where such signify substituted or unsubstituted alkyl radicals, preferably contain from 1 to 6 carbon atoms and R, where such signifies a substituted or unsubstituted alkenyl radical, preferably contains up to 6 carbon atoms.

More preferred dyes of formula I include those of formulae Ia', Ia'', Ib' and Ic',

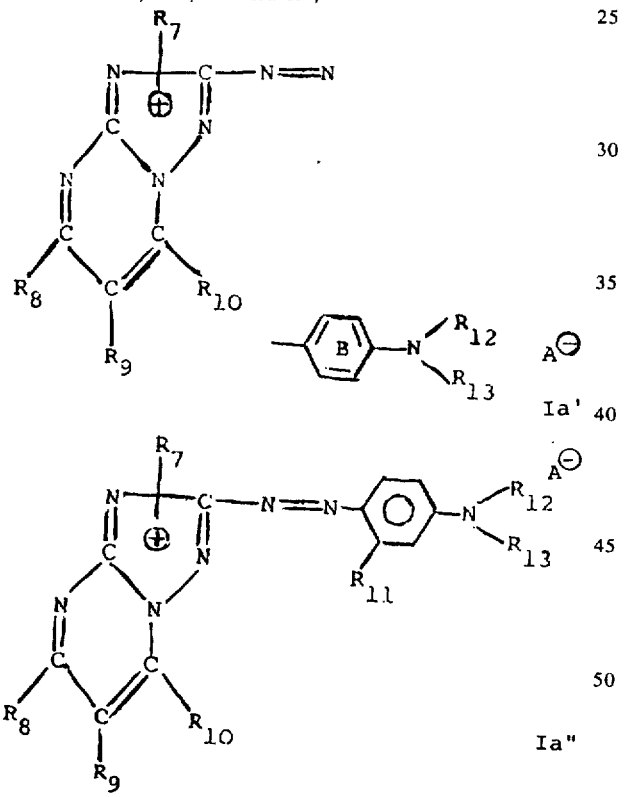

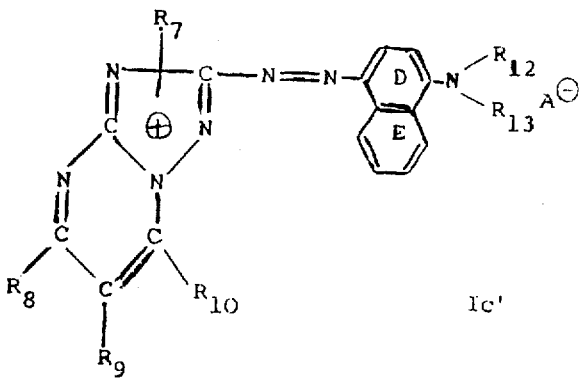

in which $R_7$ signifies an unsubstituted alkyl radical of 1 to 4 carbon atoms, an alkyl radical of 1 to 4 carbon atoms substituted by phenyl, hydroxyl or a carbamoyl group, or an alkenyl radical of 2 to 4 carbon atoms, $R_8$ and $R_{10}$, independently, signify a hydrogen atom, an alkyl or an alkoxy radical of 1 to 4 carbon atoms, a cycloalkyl radical of 5 to 7 carbon atoms, an aryl or aryloxy radical, an alkylthio radical of 1 to 4 carbon atoms, a halogen atom, a hydroxyl group or a dialkylamino radical in which each alkyl moiety contains 1 to 4 carbon atoms, $R_9$ signifies a hydrogen atom, alkyl radical of 1 to 4 carbon atoms, a cycloalkyl radical of 5 to 7 carbon atoms or an aryl radical, $R_{11}$ signifies a hydrogen atom, a halogen atom, an alkyl or alkoxy radical of 1 to 4 carbon atoms, $R_{12}$ and $R_{13}$, independently, signify a hydrogen atom, an aryl radical, an unsubstituted alkyl radical of 1 to 4 carbon atoms, an alkyl radical containing 1 to 4 carbon atoms substituted by halogen, hydroxyl, cyano, halohydrin, aryl aroyloxy, aryloxy, N-phenylcarbamoyloxy group, N,N-dialkylcarbamoyloxy alkoxy, alkanoyloxy, alkoxy further substituted by a cyano group, which alkyl, alkoxy and alkanoyloxy radicals contain 1 to 4 carbon atoms, or $R_{12}$ and $R_{13}$, together with the nitrogen atom to which they are attached, form a heterocyclic radical, for example, a morpholino, pyrrolidinyl, piperazinyl, aziridinyl or piperidinyl radical, and rings B, D and E and A are as defined above.

Even more preferred dyes of formula I include those of formulae Ia''', Ia¹ᴱ, Ib'', Ic'' and Id,

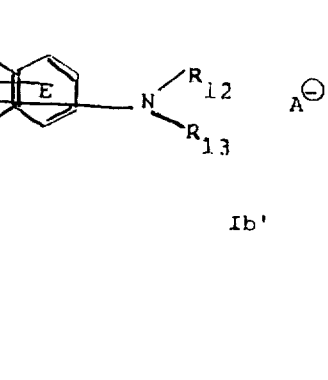

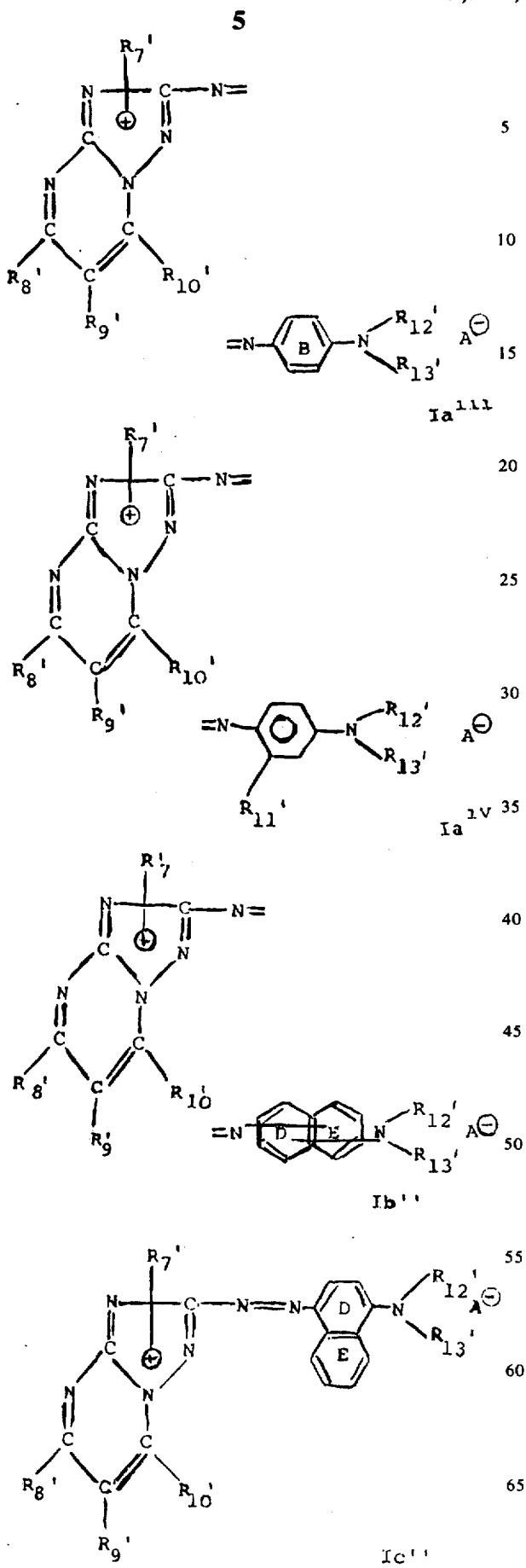

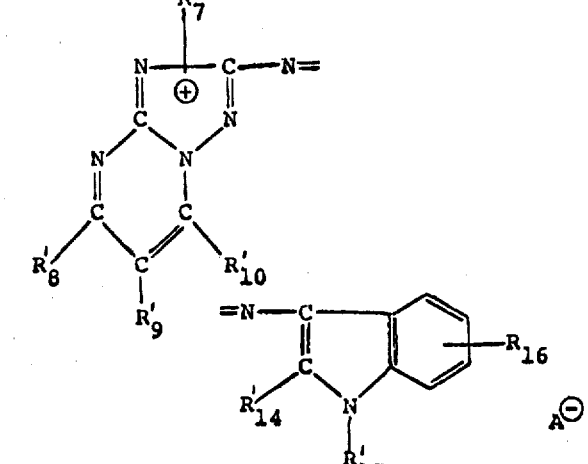

in which $R_7'$ signifies an alkyl radical of 1 to 4 carbon atoms, a benzyl radical or a 2-carboxamidoethyl(2-carbamoylethyl) radical, $R_8'$ and $R_{10}'$ independently signify a hydrogen atom, an alkyl, alkoxy or alkylthio radical of 1 to 4 carbon atoms, a hydroxyl group, a halogen atom, a benzyl or phenyl radical or a dialkylamino group of which each alkyl moiety contains 1 to 4 carbon atoms, $R_9'$ signifies a hydrogen atom, an alkyl radical of 1 to 4 carbon atoms or a phenyl radical, $R_{11}'$ signifies a halogen atom or an alkyl or alkoxy radical containing 1 to 4 carbon atoms, $R_{12}'$ and $R_{13}'$, independently, signify an alkyl radical of 1 to 4 carbon atoms, a benzyl radical, 2-hydroxyethyl, 2-chloroethyl, 2-alkoxyethyl of which the alkoxy moiety contains 1 to 4 carbon atoms, 2-phenoxyethyl, 2-acetoxyethyl, 2-benzoyloxyethyl, 2-cyanoethyl, 2-dialkylcarbamoyloxyethyl of which each alkyl group contains 1 to 4 carbon atoms or a phenyl radical, or $R_{12}'$ and $R_{13}'$, together with the nitrogen atom to which they are attached, form a morpholino, pyrrolidinyl, piperidinyl, aziridinyl or a piperazinyl radical, $R_{14}$ signifies an alkyl radical of 1 to 4 carbon atoms, a phenyl or a benzyl radical, $R_{15}$ signifies a hydrogen atom, an alkyl radical of 1 to 4 carbon atoms or benzyl, (preferably hydrogen or an alkyl radical of 1 to 4 carbon atoms) and $R_{16}$ signifies a hydrogen atom, a halogen atom or an alkyl or alkoxy radical of 1 to 4 carbon atoms, and $A^-$ and rings B, D and E are as defined above, and the dyes of the formula wherein
$R'_7$ is alkyl, benzyl or 2-carbamoylethyl, each of $R'_8$ and $R'_{10}$ is independently hydrogen, alkyl, alkoxy, alkylthio, htydroxy, halo, benzyl, phenyl or dialkylamino.

$R'_9$ is hydrogen, alkyl or phenyl,
$R'_{14}$ is hydrogen, alkyl or phenyl,
$R'_{15}$ is alkyl, phenyl or benzyl,
$R_{16}$ is hydrogen, halo, alkyl or alkoxy, and
$A^-$ is an anion, wherein each alkyl, alkoxy and alkyl moiety independently has 1 to 4 carbon atoms.

Especially preferred dyes of formula I include those of formulae Ia, Ib, Ic and Id, where R, or, in the case of formula Id, $R_7'$, signifies methyl, ethyl, 2-carbamoylethyl or 2-hydroxypropyl, R₂, or, in the case of formula Id, R₉, is hydrogen, R₁ and R₃, or, in the case of formula Id, R₈' and R₁₀', independently, signify an ethyl or methyl radical. Further representative dyes of Formula I are those of formula Ie

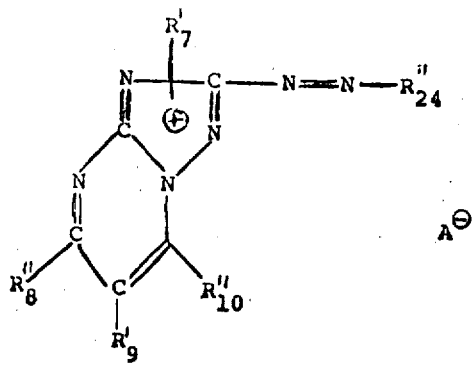

(Ie), wherein
R'₇ is alkyl, benzyl or 2-carbamoylethyl,
each of
R"₈ and R"₁₀ is independently hydrogen, alkyl alkoxy, alkylthio, halo, benzyl, phenyl or dialkylamino,
R'₉ is hydrogen, alkyl or phenyl,
R'₂₄ is

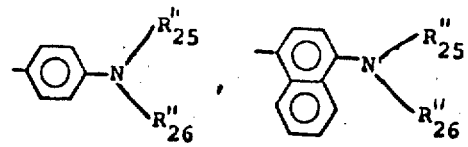

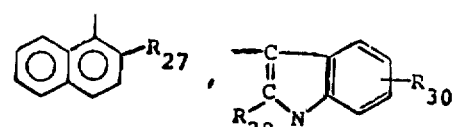

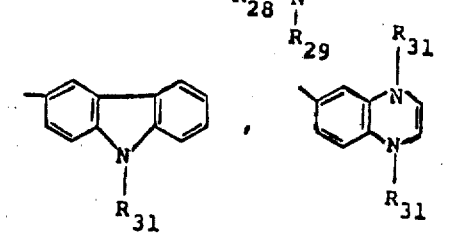

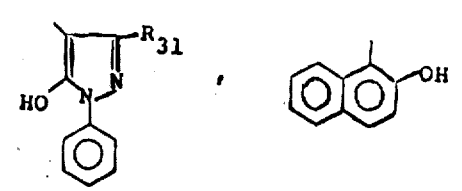

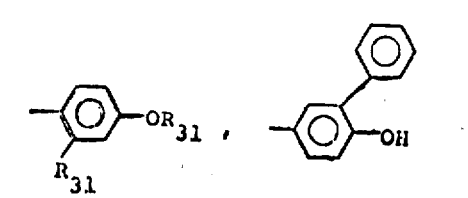

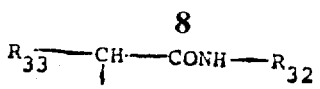

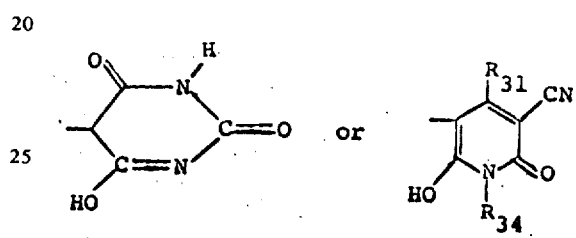

wherein each
of R"₂₅ and R"₂₆ is independently alkyl, benzyl, 2-hydroxyethyl, 2-chloroethyl, 2-alkoxyethyl, 2-phenoxyethyl, 2-acetoxyethyl, 2-acetoxypropyl, 2-benzoyloxyethyl, 2-cyanoethyl, 2-biphenylyloxyethyl, 2-biphenylyloxypropyl, 2-alkoxycarbonylethyl, 2-N-phenylcarbamoyloxyethyl or phenyl, with the proviso that not more than one of R"₂₅ and R"₂₆ is phenyl, or
R"₂₅ and R"₂₆ taken together and with the nitrogen atom to which they are joined are morpholino, piperidino or piperazino,
R₂₇ is amino or anilino,
R₂₈ is alkyl, phenyl or benzyl,
R₂₉ is hydrogen, alkyl or benzyl,
R₃₀ is hydrogen, chloro, alkyl or alkoxy,
R₃₁ is alkyl,
R₃₂ is phenyl or naphthyl,
R₃₃ is cyano, alkylcarbonyl or benzoyl, and
R₃₄ is alkyl or alkoxyalkyl, and
A⁻ is an anion,
those of the formula

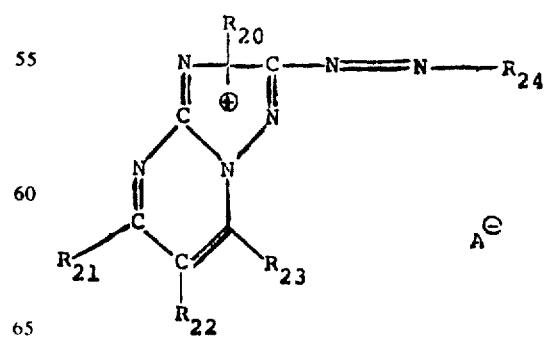

wherein $R_{20}$ is alkyl, benzyl, 2-carbamoylethyl, 2-hydroxyethyl, 2-hydroxypropyl or allyl,
each of
$R_{21}$ and $R_{23}$ is independently hydrogen, alkyl, alkoxy, benzyl or phenyl,
$R_{22}$ is hydrogen or alkyl, $R_{24}$ is

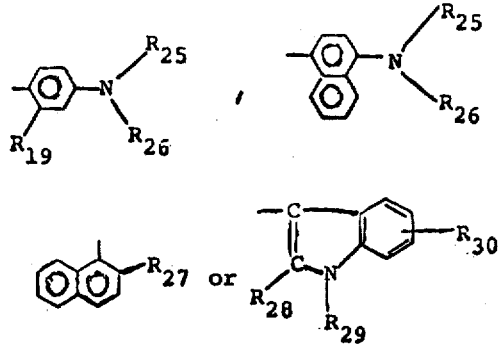

wherein
$R_{19}$ is hydrogen, chloro, alkyl or alkoxy,
each of
$R_{25}$ and $R_{26}$ is independently alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl, 2-biphenylyloxyethyl, 2-alkoxycarbonylethyl, 2-N-phenylcarbamoyloxyethyl or phenyl, with the proviso that not more than one of $R_{25}$ and $R_{26}$ is phenyl, or
$R_{25}$ and $R_{26}$ taken together and with the nitrogen atom to which they are joined are morpholino, piperidino or piperazino,
$R_{27}$ is amino or anilino,
$R_{28}$ is alkyl, phenyl or benzyl,
$R_{29}$ is hydrogen, alkyl or benzyl, and
$R_{30}$ is hydrogen, chloro, alkyl or alkoxy, and
$A^-$ is an anion,
and those of the formula

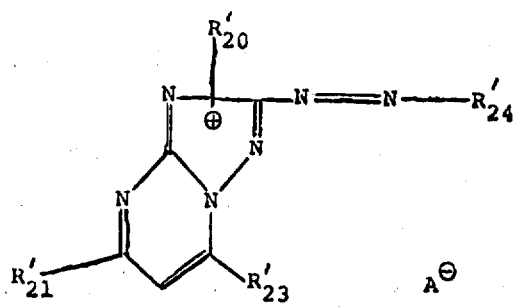

wherein
$R'_{20}$ is alkyl or 2-carbamoylethyl,
each of
$R'_{21}$ and $R'_{23}$ is independently hydrogen, alkyl or phenyl, $R'_{24}$ is

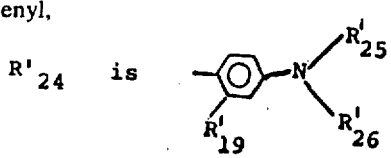 or 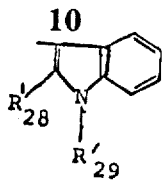, wherein
$R'_{19}$ is hydrogen or alkyl,
$R'_{25}$ is alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl or phenyl,
$R'_{26}$ is alkyl or benzyl, or
$R'_{25}$ and $R'_{26}$ taken together and with the nitrogen atom to which they are joined are morpholino,
$R'_{28}$ is alkyl or phenyl, and
$R'_{29}$ is hydrogen or alkyl, and
$A^-$ is an anion,
wherein each alkyl, alkoxy, alkyl moiety and alkoxy moiety independently has 1 to 4 carbon atoms unless otherwise indicated.

The anion $A^-$ may be an organic or inorganic ion, for example, a halogen ion such as the chloride, bromide or iodide ion, or the sulphate, disulphate, methyl sulphate, aminosulphonate, perchlorate, carbonate, bicarbonate, phosphate, phosphorus molybdate, phosphorus tungstate, phosphorus tungsten molybdate, benzenesulphonate, naphthalenesulphonate, 4chlorobenzenesulphonate, oxalate, maleate, acetate, proionate, lactate, succinate, chloroacetate, tartrate, malate, methanesulfonate or benzoate ion, or a complex anion such as that of zinc chloride double salts.

The preferred anions include aminosulphonate, $ZnCl_3^-$ and methyl sulphate.

The anion $A^-$ in the compounds of formula I can be interchanged in conventional manner, for example with the aid of an ion exchanger or by reaction with suitable salts or acids if necessary in more than one step, for example through the hydroxide or the bicarbonate.

Any alkyl and alkoxy radicals contain 1 to 4 carbon atoms, unless otherwise specified.

By halogen is understood in each instance bromine, fluorine, iodine, or, in particular, chlorine.

By aryl radical is meant an unsubstituted or substituted phenyl, biphenylyl or naphthyl radical. Preferred such aryl radicals are unsubstituted, the most preferred being phenyl.

As examples of $R_4$, coupling components, may be given radicals of the aromatic series, for example the benzene or naphthalene series, which bear a substituent permitting coupling, for example amino- or hydroxybenzenes, amino- or hydroxynaphthalenes; of the heterocyclic series such as the pyrazolone, aminopyrazole, carbazole or barbituric acid series; or of the aliphatic series, for example the alkane, alkene or alkyne series which have a coupling methylene group, for example acylacetic acid arylamides, acylacetic acid alkylamides, malonic acid and malonic acid nitrile derivatives.

In the compounds of formula I, any radical of aromatic character, such as the rings B and/or D and/or E and the heterocyclic radicals may bear substituents, in particular non-water-solubilizing substituents, for example halogen atoms, nitro, amino, cyano, thiocyano, hydroxyl, alkyl, alkoxy, trifluoroalkyl, trichloroalkyl, phenyl, phenoxy, alkylamino, dialkylamino, acyl, dialkylsulphonamide acylamino, for example urethane, alkylsulphonyl, arylsulphonyl, sulphonamide (sulfamoyl), alkylsulphonamide, dialkylsulphoamide or arylsulphonamide groups and arylazo, for example phenylazo, diphenylazo and naphthylazo. However, the rings B, D and E and any heterocyclic radicals in formulae Ia, Ib, Ic, Ia', Ib', Ic', Ia''', Ib'' and Ic'' are preferably unsubstituted.

The compounds of formula I can be converted into dyeing preparations, for example into stable liquid or solid dyeing preparations, by known methods, for example by grinding or granulating, or dissolving in suitable solvents, if necessary with the addition of an assistant, for example a stabilizer.

A method for preparing such dyeing preparations is disclosed in French Pat. Nos. 1,572,030 and 1,581,900.

The compounds of formula II are known or can be produced by known methods.

The compounds of formula I are useful for the dyeing and printing of homopolymers and copolymers of acrylonitrile and of asymmetrical dicyanoethylene in the loose fibre, yarn or fabric form. They are also useful for dyeing and printing synthetic acid modified polyamide and polyester fibres. Polyamides of this type are described in Belgian Pat. No. 706,104. Corresponding polyester fibres are described in U.S. Pat. No. 3,379,723. The compounds are also useful for pigmenting plastics in the mass and for dyeing leather and paper.

It is advantageous to dye in an aqueous neutral or acid medium at 60°C, at the boil or at temperatures above 100°C under pressure.

The dyeings obtained are level and have good light fastness and wet fastness properties, for example to washing, perspiration, sublimation, pleating, decatizing, pressing, steam, water, sea water, dry cleaning, cross dyeing and solvents. The dyes are water soluble, show compatibility with salt, notable stability to boiling, good pH stability and good power of build-up. They reserve certain fibres other than those on which they are dyeable.

The compounds, which have good solubility in organic solvents, are suitable for the pigmentation of natural and synethetic resins and synthetic polymeric materials in the presence or absence of solvents.

It has been found that mixtures of two or more of the compounds of formula I, or mixtures of these and other cationic dyes, can be used with advantage.

The following examples further illustrate the invention. In the examples the parts and percentages are by weight and the temperatures in degrees centigrade, unless otherwise stated.

EXAMPLE 1

16.3 parts (0.1 mol) of 2-amino-5,7-dimethyl-s-triazolo-[2,3-a]-pyrimidine are added in portions to 120 parts of 30% hydrochloric acid at 25°, in which it goes completely into solution. After the addition of 100 parts of ice, 32 parts of a 4/normal sodium nitrite solution are added dropwise at −5° to 0° to the suspension of the aminohydrochloride. The yellow diazo solution is then dropped immediately at the same temperature into a solution consisting of 15 parts of diethylaniline, 60 parts of glacial acetic acid and 45 parts of aminosulphonic acid. The pH is adjusted to 4–5 by the addition of 30% sodium hydroxide solution and the crystalline dye is filtered with suction, washed with water until free of salt, and dried at 50° under reduced pressure.

21 parts of the dye thus formed are dissolved in 600 parts of chloroform, 85 parts of dimethyl sulphate and 4.2 parts of magnesium oxide are added to the solution. The mixture is raised to boiling point in 30 minutes, then cooled to 25° and stirred for 3 hours. After dilution with 1200 parts of cyclohexane and decanting of the solvent mixture, the dye remaining as residue is added to 600 parts of methyl alcohol, filtered and freed from solvent under reduced pressure. The dye is dissolved in 800 parts of water at 60° with the addition of 1 part of glacial acetic acid, the solution is cooled to 25° and 160 parts of potassium iodide are added at 25°. The crystalline dye is filtered with suction, washed and dried at 50° under reduced pressure.

APPLICATION EXAMPLE A

A mixture of 20 parts of the dye salt described in example 1 and 80 parts of dextrin are ground for 4 hours in a mill. The same dye can be obtained by dispersion in 100 parts of water and subsequent spray drying. One part of the mixture is pasted with 1 part of 40% acetic acid. 200 parts of demineralized water are poured over the paste and 2 parts of glacial acetic acid are added. At 60° 100 parts of polyacrylonitrile fabric are put into the bath. The fabric may be treated for 10–15 minutes at 60° in a bath of 8000 parts of water containing 2 parts of glacial acetic acid. The dyebath is raised to 98°–100° in 30 minutes and held at the boil for 1 hour 30 minutes. On removal the fabric is rinsed. A blue-red dyeing with good light and wet fastness properties is obtained.

10 parts of acetate dye produced according to the method of example 1 are dissolved in 60 parts of glacial acetic acid and 30 parts of water. A stable concentrated solution is obtained with a dye content of about 10%, which can be used for dyeing polyacrylonitrile fibres by the method described above.

APPLICATION EXAMPLE B

A mixture of 20 parts of the dye of example 1 and 80 parts of dextrin is ground in a ball mill for 48 hours. One part of the resulting mixture is pasted with 1 part of 40% acetic acid and 200 parts of demineralized water are run over the paste, with boiling, for a short time. This stock solution is used for dyeing as follows:

a. The solution is diluted with 700 parts of demineralized water, then 21 parts of calcined sodium sulphate, 14 parts of ammonium sulphate, 14 parts of formic acid and 15 parts of a carrier based on reaction products of ethylene oxide with dichlorophenol are added. At 60° 100 parts of a fabric of a polyester fibre modified by the introduction of acid groups are put into the bath. The fabric may be pretreated for 10–15 minutes at 60° in a bath of 8000 parts of water containing 2 parts of glacial acetic acid. The bath is raised to 98°–100° in 30 minutes and held at the boil for one hour. On removal the fabric is rinsed. A level blue-red dyeing with good wet fastness properties is obtained.

b. The solution is diluted with 3000 parts of demineralized water. 18 parts of calcined sodium sulphate, 6 parts of ammonium sulphate and 6 parts of formic acid are added. At 60° 100 parts of a fabric of a polyester fibre modified by the introduction of acid groups are put into the bath in an enclosed vessel. The bath is raised to 100° in 45 minutes and this temperature is maintained for 1 hour with shaking liquor circulation. The bath is then cooled to 60° over a period of 25 minutes and the fabric rinsed. A level blue-red dyeing with good wet fastness properties is obtained.

c. The method as in b) is employed, with dyeing in the enclosed vessel for 1 hour at 120°.

The following table shows the structural composition of further dyes which can be produced in accordance with the procedure of example 1 where R and $R_1$ to $R_4$ have the meanings given in the pertinent columns. The anion $A^-$ may be any one of those hereinbefore listed.

TABLE

| Ex. No. | $R_1$ | $R_2$ | $R_3$ | R | $R_4$ | Shade of dyeing on polyacrylonitrile fiber |
|---|---|---|---|---|---|---|
| 2 | —$CH_3$ | H | —$CH_3$ | —$CH_3$ | —C₆H₄—N($CH_3$)$_2$ | bluish red |
| 3 | " | H | " | " | —C₆H₃($CH_3$)—N($C_2H_5$)$_2$ | reddish violet |
| 4 | " | H | " | " | —C₆H₄—N($C_4H_9$)$_2$ | bluish red |
| 5 | " | H | " | " | —C₆H₄—N($C_2H_5$)($CH_2$—C₆H₅) | " |
| 6 | " | H | " | " | —C₆H₄—N($C_2H_5$)($C_2H_4$—O—C₆H₅) | " |
| 7 | " | H | " | " | —C₆H₄—N($C_2H_5$)($C_2H_4$O—$C_2H_4$CN) | " |
| 8 | " | H | " | " | —C₆H₄—N($C_2H_5$)($C_2H_4$O—CO—C₆H₅) | " |
| 9 | " | H | " | " | —C₆H₄—N($C_2H_5$)($C_2H_4$Cl) | " |
| 10 | " | H | " | " | —C₆H₄—N($C_2H_5$)($C_2H_4$O—CO—NH—C₆H₅) | " |
| 11 | " | H | " | " | —C₆H₄—N($C_2H_5$)($CH_2$—CH(OH)—$CH_2$Cl) | bluish red |
| 12 | " | H | " | " | —C₆H₄—N($C_2H_5$)($C_2H_4$OH) | reddish violet |
| 13 | " | H | " | " | —C₆H₃(Cl)—N($C_2H_5$)$_2$ | red |
| 14 | " | H | " | " | —C₆H₃($CH_3$)—N($CH_3$)$_2$ | " |

3,980,632
TABLE-continued
| Ex. No. | $R_1$ | $R_2$ | $R_3$ | R | $R_4$ | Shade of dyeing on polyacrylonitrile fiber |
|---|---|---|---|---|---|---|
| 15 | —CH$_3$ | H | —CH$_3$ | —CH$_3$ | 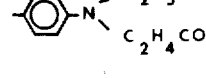 | bluish red |
| 16 | " | H | " | " | 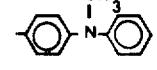 | reddish violet |
| 17 | " | H | " | " | 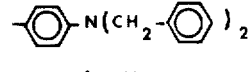 | bluish red |
| 18 | " | H | " | " | 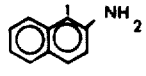 | scarlet |
| 19 | " | H | " | " | 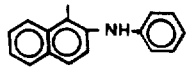 | " |
| 20 | " | H | " | " | 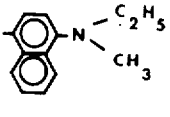 | bluish violet |
| 21 | " | H | " | " | 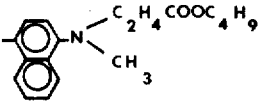 | bluish violet |
| 22 | " | H | " | " | 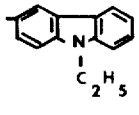 | reddish brown |
| 23 | " | H | " | " | 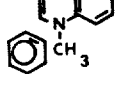 | reddish yellow |
| 24 | " | H | " | " | 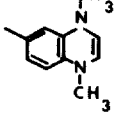 | " |
| 25 | " | H | " | " | 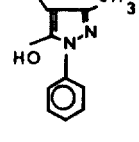 | yellow |
| 26 | " | H | " | " | 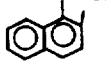 | orange |

TABLE-continued

| Ex. No. | R₁ | R₂ | R₃ | R | R₄ | Shade of dyeing on polyacrylonitrile fiber |
|---|---|---|---|---|---|---|
| 27 | —CH₃ | H | —CH₃ | —CH₃ | 2-methoxy-6-methylphenyl | " |
| 28 | " | H | phenyl | " | —C₆H₄—N(C₂H₅)₂ | brown-red |
| 29 | phenyl | H | —CH₃ | " | " | " |
| 30 | phenyl | H | phenyl | —CH₃ | —C₆H₄—N(C₂H₅)₂ | rubine |
| 31 | cyclohexyl | H | cyclohexyl | " | " | " |
| 32 | H | H | H | " | " | " |
| 33 | —CH₃ | H | —OCH₃ | " | " | " |
| 34 | " | H | —O-cyclohexyl | " | " | " |
| 35 | HO— | H | —CH₃ | " | " | " |
| 36 | —Cl | H | " | " | " | " |
| 37 | —CH₃ | H | —Cl | " | " | " |
| 38 | CH₃O— | H | —CH₃ | " | " | " |
| 39 | C₆H₅—O | H | " | " | " | " |
| 40 | (C₂H₅)₂N— | H | —N(C₂H₅)₂ | " | " | " |
| 41 | —CH₃ | —CH₃ | —CH₃ | " | " | " |
| 42 | " | phenyl | CH₃ | " | " | " |
| 43 | —CH₃ | cyclohexyl | —CH₃ | " | " | " |
| 44 | —CH₃ | H | —CH₃ | —C₃H₈ | " | " |
| 45 | " | H | " | —CH₂—C₆H₅ | " | " |
| 46 | " | H | " | —CH₂—CONH₂ | " | " |
| 47 | " | H | " | —C₂H₄CONH₂ | " | " |
| 48 | " | H | " | —CH₂CH₂OH | " | " |
| 49 | —CH₃ | H | phenyl | —CH₂—CH(CH₃)—OH | —C₆H₄—N(C₂H₅)₂ | rubine |
| 50 | " | H | " | —CH₂—CH=CH₂ | " | " |
| 51 | CH₃S— | H | CH₃S | —CH₃ | " | " |
| 52 | —CH₃ | H | —CH₃ | " | 2-hydroxynaphthyl | yellow |
| 53 | " | H | " | " | CH₃—CO—CH(CH₃)—CONH—C₆H₅ | " |
| 54 | " | H | " | " | C₆H₅—CO—CH(CH₃)—CONH—C₆H₅ | " |
| 55 | " | H | " | " | —CH— (1,3-dimethyl-barbituric acid residue) | " |

TABLE-continued

| Ex. No. | R₁ | R₂ | R₃ | R | R₄ | Shade of dyeing on polyacrylonitrile fiber |
|---|---|---|---|---|---|---|
| 56 | —CH₃ | H | —CH₃ | —CH₃ | (barbituric acid derivative) | '' |
| 57 | '' | H | '' | '' | —CH(CN)—C(=O)—NH-(indolyl) | '' |
| 58 | '' | H | '' | '' | -C₆H₄-N(C₂H₅)(C₂H₄-O-C₆H₄-C₆H₅) | bluish red |
| 59 | '' | H | '' | '' | -C₆H₄-N(C₂H₅)(C₂H₄-O-C₆H₄-phenyl) | '' |
| 60 | '' | H | '' | '' | -C₆H₄-N(CH₃)(CH₂-CH(CH₃)-O-C₆H₄-C₆H₅) | bluish red |
| 61 | '' | H | '' | '' | -C₆H₄-N(CH₃)(CH₂-CH(CH₃)-O-C₆H₅) | '' |
| 62 | '' | H | '' | '' | -C₆H₄-N(C₂H₅)(C₂H₄-O-C(=O)-N(CH₃)₂) | '' |
| 63 | '' | H | '' | '' | -C₆H₄-N(C₂H₅)(C₂H₄-O-C(=O)-C₆H₄-C₆H₅) | '' |
| 64 | '' | H | '' | '' | -C₆H₄-N(C₂H₅)(C₂H₄-O-C(=O)-naphthyl) | '' |
| 65 | '' | H | '' | '' | -C₆H₄-N(C₂H₅)(C₂H₄-O-C(=O)-C₆H₃Cl₂) | '' |
| 66 | '' | H | '' | '' | -C₆H₄-N(C₂H₄-O-C₂H₅)₂ | '' |
| 67 | '' | H | '' | '' | -C₆H₄-N(C₂H₄-CN)(C₂H₄-CN) | red |
| 68 | '' | H | '' | '' | (1-benzyl-2-methylindol-3-yl) | reddish yellow |
| 69 | '' | H | '' | '' | (1-H-2-benzyl-indol-3-yl) | '' |
| 70 | '' | H | '' | '' | -C₆H₄-N(C₂H₄OCOCH₃)(C₂H₄OCOCH₃) | red |

Further dyes with the formulae shown below can be produced in accordance with the procedure of Example 1.
Exple. No.                                 Shade of dyeing on polyacrylonitrile fibre
71 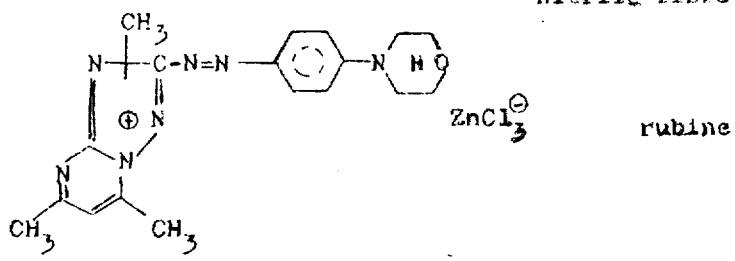 rubine
72 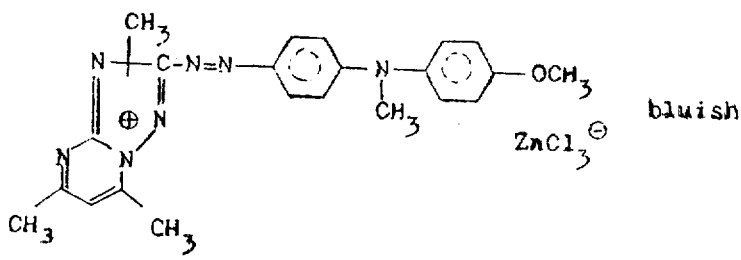 bluish
73 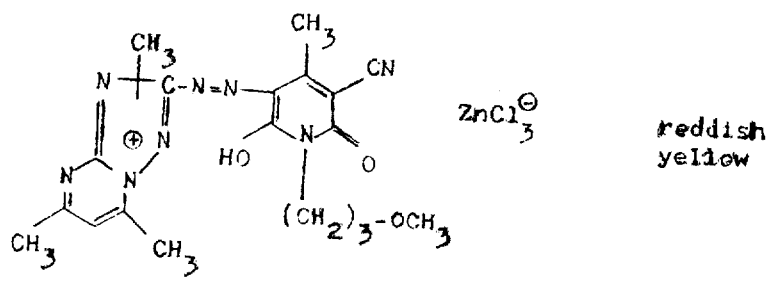 reddish yellow
74 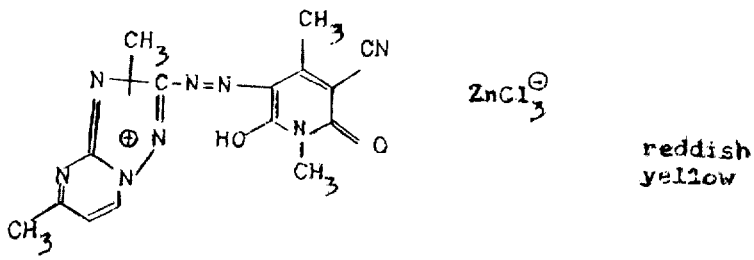 reddish yellow
Formulae of representative dyes of the foregoing Examples are as follows:
EXAMPLE 1
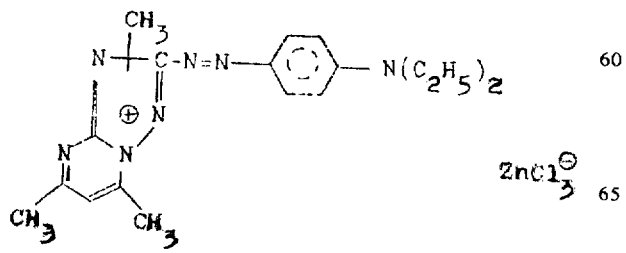
EXAMPLE 3
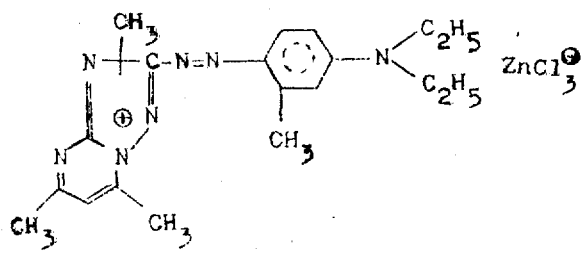

EXAMPLE 5

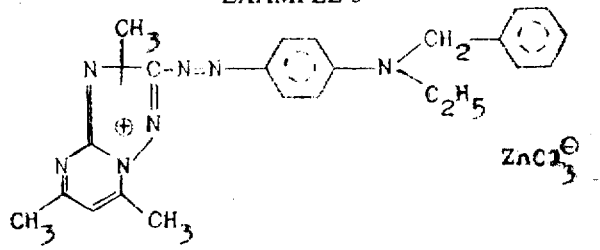

EXAMPLE 23

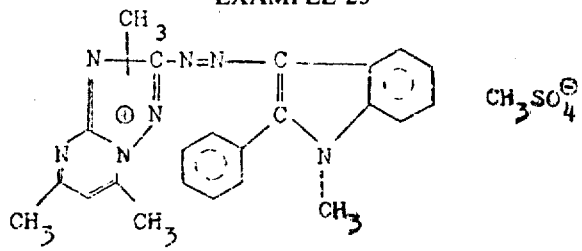

EXAMPLE 44

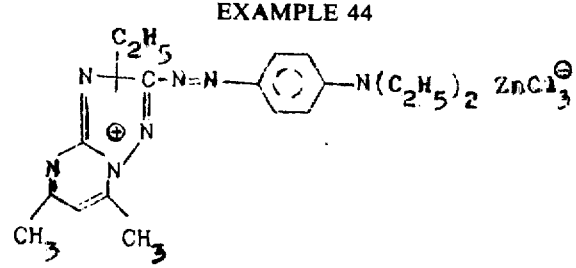

EXAMPLE 47

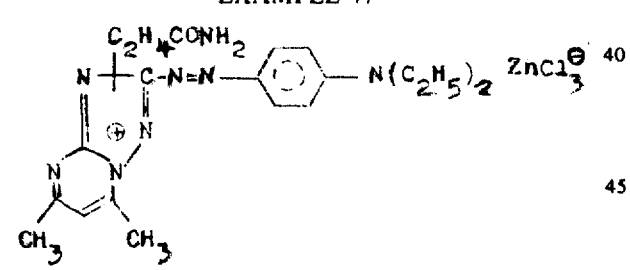

What is claimed is:
1. A basic dye of the formula

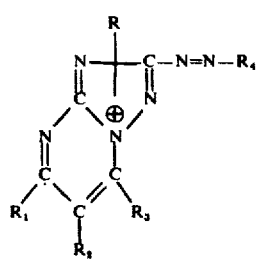

or a mixture thereof,
wherein
R is alkyl of 1 to 18 carbon atoms; alkyl of 1 to 18 carbon atoms monosubstituted by phenyl, hydroxy or carbamoyl or alkenyl of 2 to 18 carbon atoms, each of $R_1$ and $R_3$ is independently hydrogen; hydroxy; halo; alkyl of 1 to 18 carbon atoms; alkyl of 1 to 18 carbon atoms monosubstituted by phenyl; aryl; cycloalkyl of 5 to 7 carbon atoms; alkoxy of 1 to 6 carbon atoms; aryloxy; amino; dialkylamino each alkyl radical of which independently has 1 to 4 carbon atoms or alkylthio of 1 to 6 carbon atoms, $R_2$ is hydrogen, alkyl of 1 to 18 carbon atoms, aryl or cycloalkyl of 5 to 7 carbon atoms, $R_4$ is

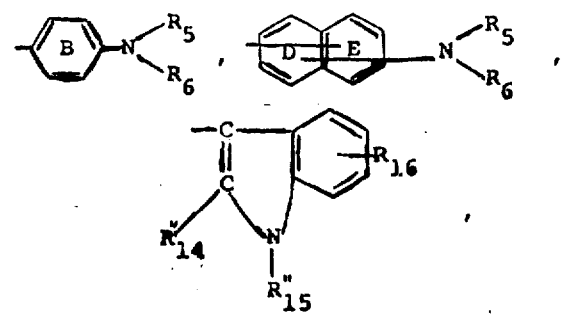

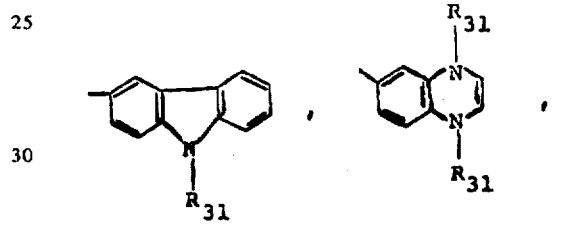

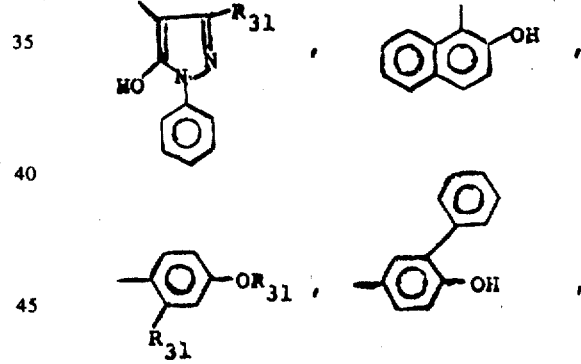

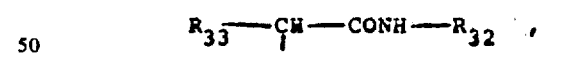

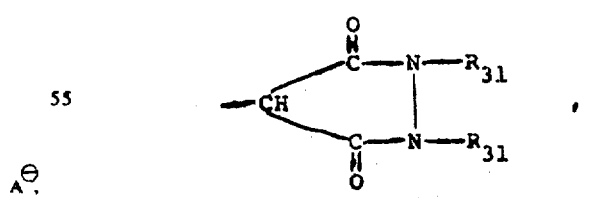

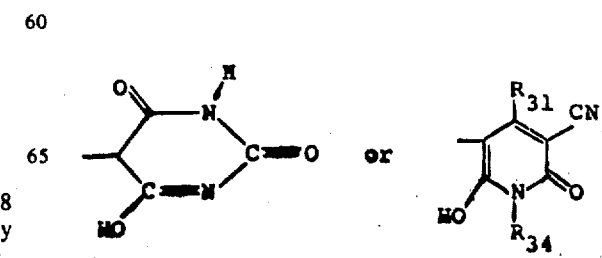

wherein each of
R$_5$ and R$_6$ is independently hydrogen; alkyl of 1 to 6 carbon atoms; alkyl of 1 to 6 carbon atoms monosubstituted by halo, hydroxy, cyano, aryl, aroyloxy, dihalobenzoyloxy, aryloxy, alkoxy, cyanoalkoxy, N-phenylcarbamoyloxy, N,N-dialkylcarbamoyloxy, alkylcarbonyloxy or alkoxycarbonyl; 3-halo-2-hydroxypropyl; aryl or alkoxyphenyl, or R$_5$ and R$_6$ taken together and with the nitrogen atom to which they are joined are morpholino, piperazino, aziridino, pyrrolidino or piperidino, R$_{14}''$ is hydrogen, alkyl, phenyl or benzyl,
R$_{15}''$ is hydrogen, alkyl, phenyl or benzyl,
R$_{16}$ is hydrogen, halo, alkyl or alkoxy, each
R$_{31}$ is alkyl,
R$_{32}$ is phenyl or naphthyl,
R$_{33}$ is cyano, alkylcarbonyl or benzoyl, and
R$_{34}$ is alkyl or alkoxyalkyl, wherein each of Rings B, D and E is further unsubstituted or further substituted, any further substituent being halo, nitro, amino, cyano, thiocyano, hydroxy, alkyl, alkoxy, trifluoroalkyl, trichloroalkyl, phenyl, phenoxy, alkylamino, dialkylamino, carbamoyloxy, alkylsulfonyl, arylsulfonyl, sulfamoyl, alkylslfamoyl, dialkylsulfamoyl, arylsulfamoyl or arylazo; and A is an anion,
wherein
each halo is independently fluoro, chloro, bromo or iodo,
each aryl and aryl moiety is independently phenyl, biphenylyl or naphthyl, and
each alkyl, alkoxy, alkyl moiety and alkoxy moiety independently has 1 to 4 carbon atoms unless otherwise indicated.

2. A mixture of basic dyes according to claim 1.
3. A basic dye according to claim 1.
4. A basic dye according to claim 1, or a mixture thereof,
wherein
Ring B is further unsubstituted or is further substituted by one substituent and Rings D and E are further unsubstituted.

5. A basic dye according to claim 4, or a mixture thereof,
wherein
Ring B is further unsubstituted or is further substituted ortho to the azo group by halo, alkyl or alkoxy and Rings D and E are further unsubstituted.

6. A basic dye according to claim 5.
7. A mixture of basic dyes according to claim 5.
8. A basic dye according to claim 5, or a mixture thereof, wherein R$_4$ is

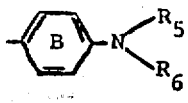

9. A basic dye according to claim 8, or a mixture thereof,
wherein
R is methyl, ethyl, 2-carbamoylethyl or 2-hydroxypropyl, each of R$_1$ and R$_3$ is independently methyl or ethyl, and
R$_2$ is hydrogen.

10. A basic dye according to claim 8 having the formula

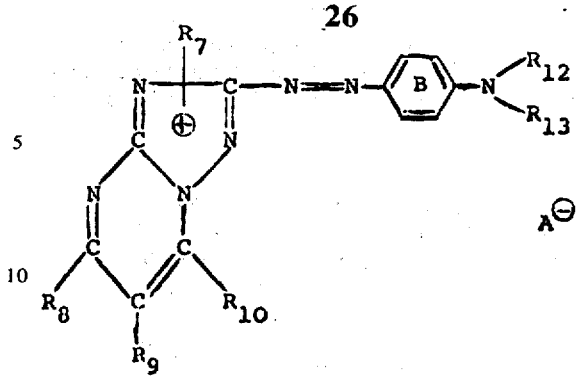

or a mixture thereof,
wherein
R$_7$ is alkyl, alkyl monosubstituted by phenyl, hydroxy or carbamoyl or alkenyl of 2 to 4 carbon atoms,
each of
r$_8$ and R$_{10}$ is independently hydrogen, halo, hydroxy, alkyl, alkoxy, cycloalkyl of 5 to 7 carbon atoms, aryloxy, alkylthio or dialkylamino,
R$_9$ is hydrogen, alkyl, cycloalkyl of 5 to 7 carbon atoms or aryl,
each of
R$_{12}$ and R$_{13}$ is independently hydrogen; aryl; alkyl; alkyl monosubstituted by halo, hydroxy, cyano, aryl, aroyloxy, aryloxy, alkoxy, cyanoalkoxy, N-phenylcarbamoyloxy, N,N-dialkylcarbamoyloxy or alkylcarbonyloxy or 3-halo-2-hydroxypropyl, or
R$_{12}$ and R$_{13}$ taken together and with the nitrogen atom to which they are joined are morpholino, piperazino, aziridino, pyrrolidino or piperidino, and
A$^\ominus$ is an anion,
wherein Ring B is further unsubstituted or further substituted ortho to the azo group by halo, alkyl or alkoxy.

11. A basic dye according to claim 8 having the formula

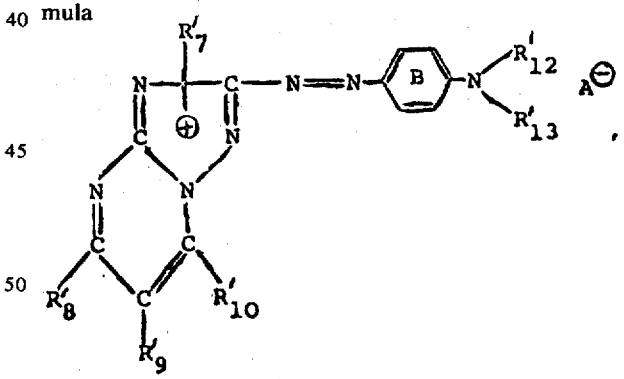

or a mixture thereof,
wherein
R'$_7$ is alkyl, benzyl or 2-carbamoylethyl,
each
of R'$_8$ and R'$_{10}$ is independently hydrogen, alkyl, alkoxy, alkylthio, hydroxy, halo, benzyl, phenyl or dialkylamino,
R'$_9$ is hydrogen, alkyl or phenyl,
each of
R'$_{12}$ and R'$_{13}$ is independently alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl, 2-N,N-dialkylcarbamoyloxyethyl or phenyl, or R'₁₂ and R'₁₃ taken together and with the nitrogen atom to which they are joined are morpholino, piperidino, aziridino, pyrrolidino or piperazino, and A⊖ is an anion, wherein Ring B is further unsubstituted or further substituted ortho to the azo group by halo, alkyl or alkoxy.

12. A basic dye according to claim 11 having the formula

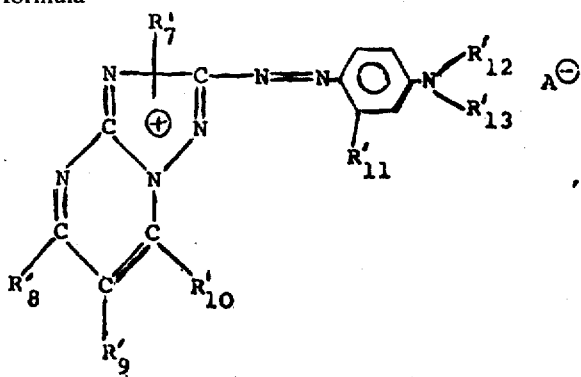

or a mixture thereof,
wherein

R'₇ is alkyl, benzyl or 2-carbamoylethyl,
each
of R'₈ and R'₁₀ is independently hydrogen, alkyl, alkoxy, alkylthio, hydroxy, halo, benzyl, phenyl or dialkylamino, R'₉ is hydrogen, alkyl or phenyl, R'₁₁ is halo, alkyl or alkoxy, each of R'₁₂ and R'₁₃ is independently alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl, 2-N,N-dialkylcarbamoyloxyethyl or phenyl, or R'₁₂ and R'₁₃ taken together and with the nitrogen atom to which they are joined are morpholino, piperidino, aziridino, pyrrolidino or piperazino, and A⊖ is an anion, 13. A basic dye according to claim 5, or a mixture thereof,
wherein
R₄ is

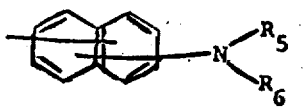

14. A basic dye according to claim 13, or a mixture thereof,
wherein
R is methyl, ethyl, 2-carbamoylethyl or 2-hydroxypropyl,
each of
R₁ and R₃ is independently methyl or ethyl, and
R₂ is hydrogen.

15. A basic dye according to claim 8 having the formula

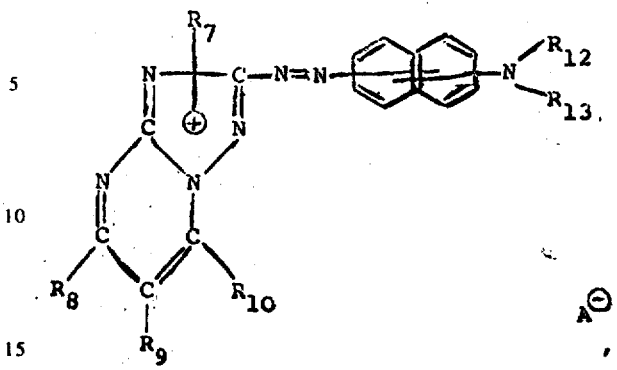

or a mixture thereof,
wherein

R₇ is alkyl, alkyl monosubstituted by phenyl, hydroxy or carbamoyl or alkenyl of 2 to 4 carbon atoms,
each of R₈ and R₁₀ is independently hydrogen, halo, hydroxy, alkyl, alkoxy, cycloalkyl of 5 to 7 carbon atoms, aryloxy, alkylthio or dialkylamino, R₉ is hydrogen, alkyl, cycloalkyl of 5 to 7 carbon atoms or aryl,
each of R₁₂ and R₁₃ is independently hydrogen; aryl; alkyl; alkyl monosubstituted by halo, hydroxy, cyano, aryl, aroyloxy, aryloxy, alkoxy, cyanoalkoxy, N-phenylcarbamoyloxy, N,N-dialkylcarbamoyloxy or alkylcarbonyloxy or 3-halo-2-hydroxypropyl, or R₁₂ and R₁₃ taken together and with the nitrogen atom to which they are joined are morpholino, piperazino, aziridino, pyrrolidino or piperidino, and A⊖ is an anion.

16. A basic dye according to claim 15 having the formula

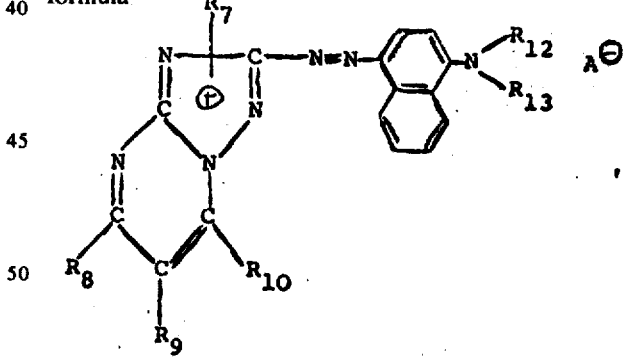

or a mixture thereof.

17. A basic dye according to claim 8 having the formula

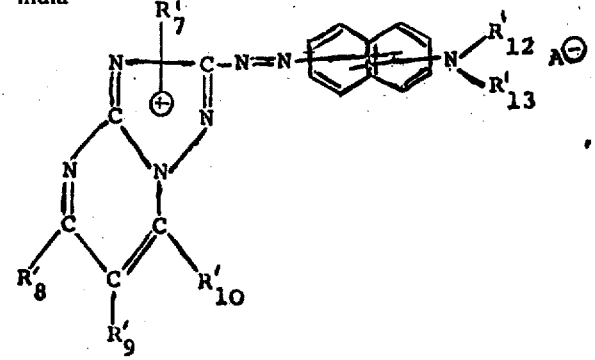

or a mixture thereof,
wherein
R'$_7$ is alkyl, benzyl or 2-carbamoylethyl,
each of R'$_8$ and R'$_{10}$ is independently hydrogen, alkyl, alkoxy, alkylthio, hydroxy, halo, benzyl, phenyl or dialkylamino,
R'$_9$ is hydrogen, alkyl or phenyl,
each of
R'$_{12}$ and R'$_{13}$ is independently alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl, 2-N,N-dialkylcarbamoyloxyethyl or phenyl, or
R'$_{12}$ and R'$_{13}$ taken together and with the nitrogen atom to which they are joined are morpholino, piperidino, aziridino, pyrrolidino or piperazino, and
A$^\ominus$ is an anion, 18. A basic dye according to claim 17 having the formula or a mixture thereof.

19. A basic dye according to claim 5 having the formula or a mixture thereof,
wherein
R'$_7$ is alkyl, benzyl or 2-carbamoylethyl,
each of R'$_8$ and R'$_{10}$ is independently hydrogen, alkyl, alkoxy, alkylthio, hydroxy, halo, benzyl, phenyl or dialkylamino,
R'$_9$ is hydrogen, alkyl or phenyl,
R$_{14}$ is alkyl, phenyl or benzyl,
R$_{15}$ is hydrogen, alkyl or benzyl,
R$_{16}$ is hydrogen, halo, alkyl or alkoxy, and
A$^\ominus$ is an anion.

20. A basic dye according to claim 19, or a mixture thereof,
wherein
R$_{15}$ is hydrogen or alkyl.

21. A basic dye according to claim 5 having the formula wherein
R' is methyl, ethyl, 2-carbamoylethyl or 2hydroxypropyl,
each of
R'$_1$ and R'$_3$ is independently methyl or ethyl,
R$_{14}$ is alkyl, phenyl or benzyl,
R$_{15}$ is hydrogen, alkyl or benzyl,
R$_{16}$ is hydrogen, halo, alkyl or alkoxy, and
A$^\ominus$ is an anion.

22. A basic dye according to claim 8 having the formula or a mixture thereof,
wherein
R'$_7$ is alkyl, benzyl or 2-carbamoylethyl,
each of R'$_8$ and R'$_{10}$ is independently hydrogen, alkyl, alkoxy, alkylthio, hydroxy, halo, benzyl, phenyl or dialkylamino,
R'$_9$ is hydrogen, alkyl or phenyl,
R'$_{14}$ is hydrogen, alkyl or phenyl,
R'$_{15}$ is alkyl, phenyl or benzyl,
R$_{16}$ is hydrogen, halo, alkyl or alkoxy, and
A$^\ominus$ is an anion.

23. A basic dye according to claim 8 having the formula or a mixture thereof,
wherein
R'₇ is alkyl, benzyl or 2-carbamoylethyl,
each of
R''₈ and R''₁₀ is independently hydrogen, alkyl, alkoxy, alkylthio, halo, benzyl, phenyl or dialkylamino,
R'₉ is hydrogen, alkyl or phenyl,
R''₂₄ is

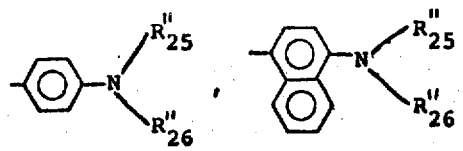

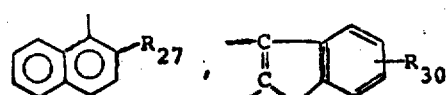

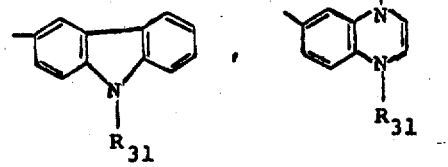

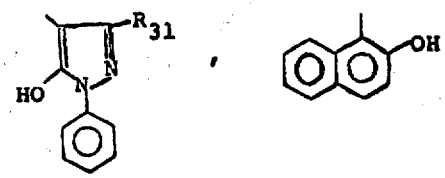

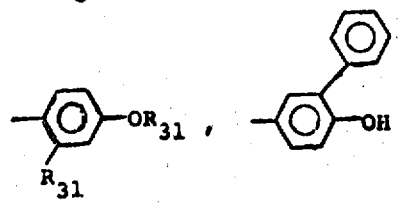

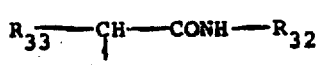

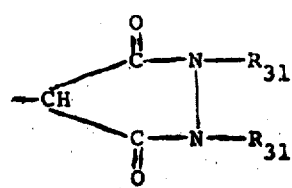

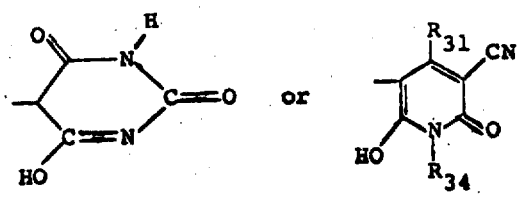

wherein
each of R''₂₅ and R''₂₆ is independently alkyl, benzyl, 2-hydroxyethyl, 2-chloroethyl, 2-alkoxyethyl, 2-phenoxyethyl, 2-acetoxyethyl, 2-acetoxypropyl, 2-benzoyloxyethyl, 2-cyanoethyl, 2-biphenylyloxyethyl, 2-biphenylyloxypropyl, 2-alkoxycarbonylethyl, 2-N-phenylcarbamoyloxyethyl or phenyl, with the proviso that not more than one of R''₂₅ and R''₂₆ is phenyl, or
R''₂₅ and R''₂₆ taken together and with the nitrogen atom to which they are joined are morpholino, piperidino or piperazino, R₂₇ is amino or anilino,
R₂₈ is alkyl, phenyl or benzyl,
R₂₉ is hydrogen, alkyl or benzyl,
R₃₀ is hydrogen, chloro, alkyl or alkoxy,
R₃₁ is alkyl,
R₃₂ is phenyl or naphthyl,
R₃₃ is cyano, alkylcarbonyl or benzoyl, and
R₃₄ is alkyl or alkoxyalkyl and
A⊖ is an anion.

24. A basic dye according to claim 5 having the formula

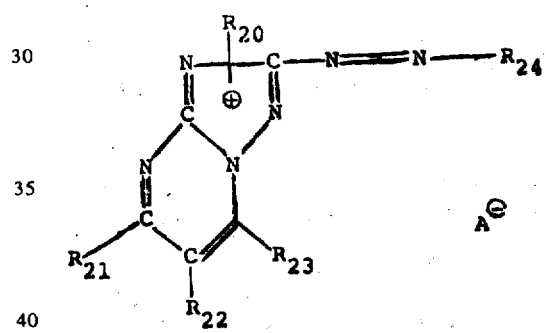

or a mixture thereof,
wherein
R₂₀ is alkyl, benzyl, 2-carbamoylethyl, 2-hydroxyethyl, 2-hydroxypropyl or allyl,
each of
R₂₁ and R₂₃ is independently hydrogen, alkyl, alkoxy, benzyl or phenyl,
R₂₂ is hydrogen or alkyl,
R₂₄ is

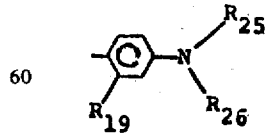 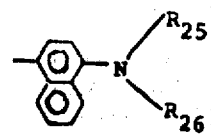

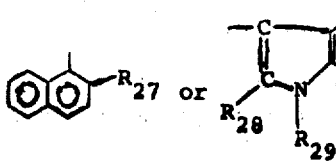 or 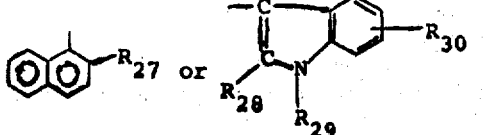

wherein $R_{19}$ is hydrogen, chloro, alkyl or alkoxy, each of $R_{25}$ and $R_{26}$ is independently alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl, 2-biphenylyloxyethyl, 2-alkoxycarbonylethyl, 2-N-phenylcarbamoyloxyethyl or phenyl, with the proviso that not more than one of $R_{25}$ and $R_{26}$ is phenyl, or $R_{25}$ and $R_{26}$ taken together and with the nitrogen atom to which they are joined are morpholino, piperidino or piperazino, $R_{27}$ is amino or anilino, $R_{28}$ is alkyl, phenyl or benzyl, $R_{29}$ is hydrogen, alkyl or benzyl, and $R_{30}$ is hydrogen, chloro, alkyl or alkoxy, and $A^{\ominus}$ is an anion, wherein each alkyl, alkoxy, alkyl moiety and alkoxy moiety independently has 1 to 4 carbon atoms unless otherwise indicated.

25. A basic dye according to claim 24.
26. A mixture of basic dyes according to claim 24.
27. A basic dye according to claim 24, or a mixture thereof,
wherein
$R_{24}$ is

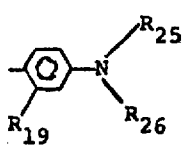

28. A basic dye according to claim 24, or a mixture thereof,
wherein
$R_{24}$ is

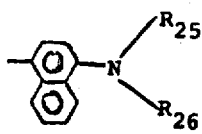

29. A basic dye according to claim 24, or a mixture thereof,
wherein
$R_{24}$ is

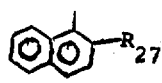

30. A basic dye according to claim 24, or a mixture thereof,
wherein
$R_{24}$ is

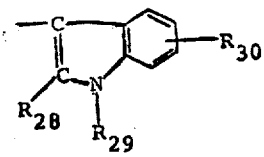

31. A basic dye according to claim 24 having the formula

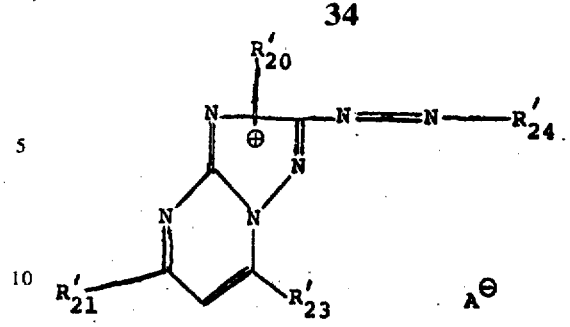

or a mixture thereof,
wherein
$R'_{20}$ is alkyl or 2-carbamoylethyl,
each of
$R'_{21}$ and $R'_{23}$ is independently hydrogen, alkyl or phenyl,
$R'_{24}$ is

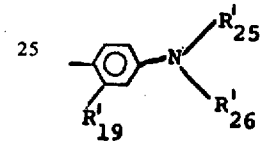 or 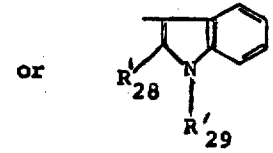

wherein $R'_{19}$ is hydrogen or alkyl, $R'_{25}$ is alkyl, benzyl, 2-hydroxyethyl, 2-chloroethyl, 2-alkoxyethyl, 2-phenoxyethyl, 2-acetoxyethyl, 2-benzoyloxyethyl, 2-cyanoethyl or phenyl, $R'_{26}$ is alkyl or benzyl, or $R'_{25}$ and $R'_{26}$ taken together and with the nitrogen atom to which they are joined are morpholino, $R'_{28}$ is alkyl or phenyl, and $R'_{29}$ is hydrogen or alkyl, and $A^{\ominus}$ is an anion, wherein each alkyl and each alkoxy moiety independently has 1 to 4 carbon atoms unless otherwise indicated.

32. A basic dye according to claim 31.
33. A basic dye according to claim 31, or a mixture thereof,
wherein $R'_{24}$ is

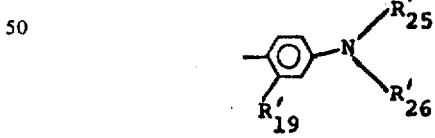

34. A basic dye according to claim 31, or a mixture thereof,
wherein $R'_{24}$ is

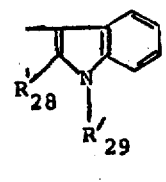

35. A basic dye according to claim 31 having the formula

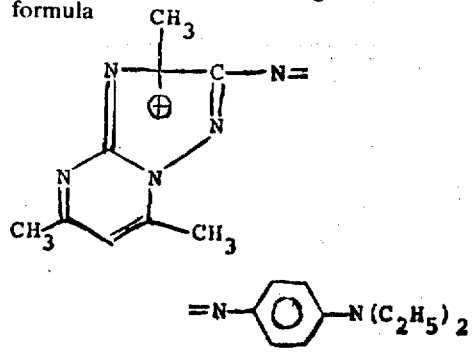

or a mixture thereof,
wherein A⊖ is an anion.

36. A basic dye according to claim 35, or a mixture thereof, wherein A⊖ is ZnCl₃⊖.

37. A basic dye according to claim 31 having the formula

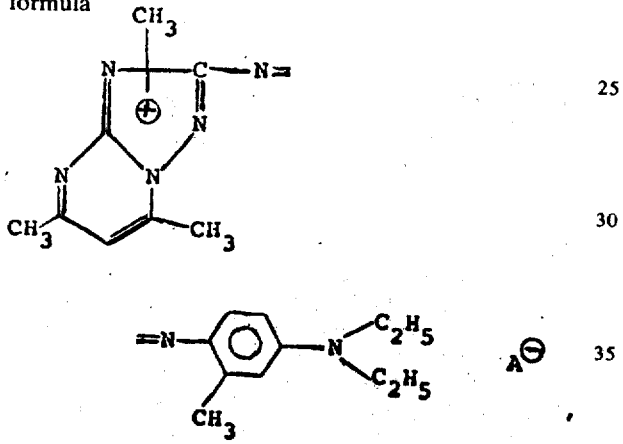

or a mixture thereof,
wherein A⊖ is an anion.

38. A basic dye according to claim 37, or a mixture thereof, wherein A⊖ is ZnCl₃⊖.

39. A basic dye according to claim 31 having the formula

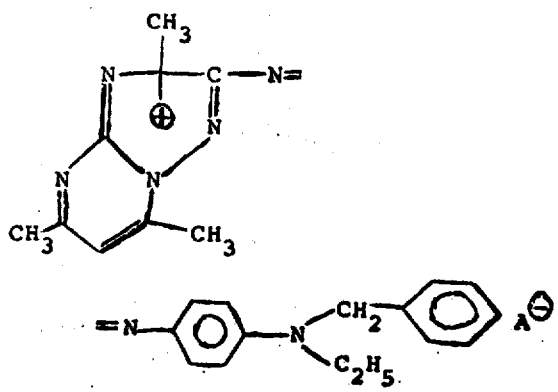

or a mixture thereof,
wherein A⊖ is an anion.

40. A basic dye according to claim 39, or a mixture thereof, wherein A⊖ is ZnCl₃⊖.

41. A basic dye according to claim 31 having the formula

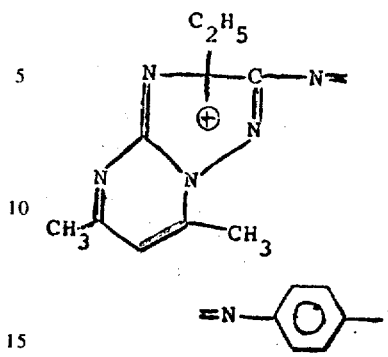

or a mixture thereof,
wherein A⊖ is an anion.

42. A basic dye according to claim 41, or a mixture thereof, wherein A⊖ is ZnCl₃⊖.

43. A basic dye according to claim 31 having the formula

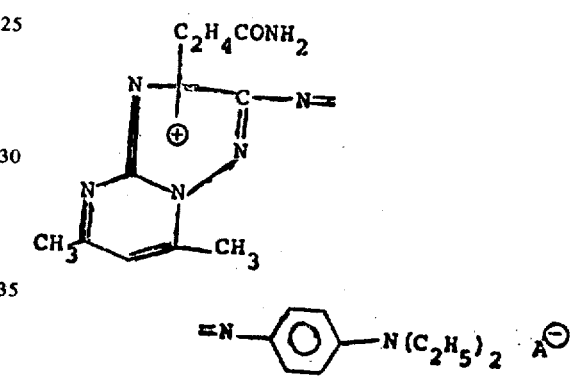

or a mixture thereof,
wherein A⊖ is an anion.

44. A basic dye according to claim 43, or a mixture thereof, wherein A⊖ is ZnCl₃⊖.

45. A basic dye according to claim 31 having the formula

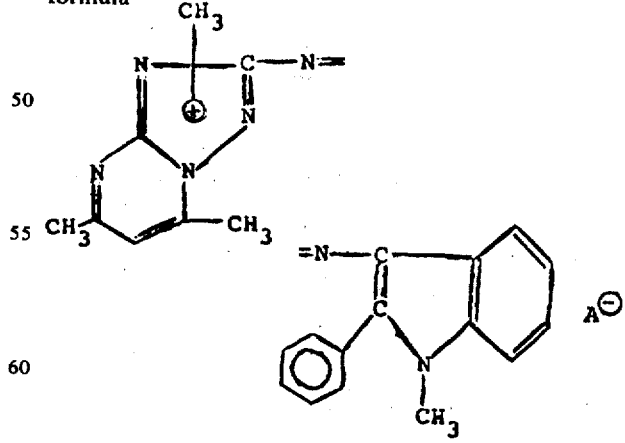

or a mixture thereof,
wherein A⊖ is an anion.

46. A basic dye according to claim 45, or a mixture thereof, wherein A⊖ is CH₃SO₃⊖.

* * * * *